UNITED STATES PATENT OFFICE.

RALPH BAGGALEY, OF PITTSBURG, PENNSYLVANIA.

METHOD OF SMELTING AND REFINING COPPER ORES AND COMPOUNDS.

No. 862,378.　　　　　Specification of Letters Patent.　　　Patented Aug. 6, 1907.

Application filed April 7, 1905. Serial No. 254,347.

*To all whom it may concern:*

Be it known that I, RALPH BAGGALEY, of Pittsburg, Allegheny county, Pennsylvania, have invented a new and useful Method of Smelting and Refining Copper Ores and Compounds, of which the following is a full, clear, and exact description.

My invention relates to a continuous process of smelting and refining ores and compounds of copper, or copper in association with other metals, whereby sulfids, oxids and carbonates can be changed into refined copper or pig copper more rapidly and with less cost than has been possible heretofore.

The series of steps by which this result is secured in accordance with my invention is as follows:—

First. The first step of my process is a smelting operation, by which without carbonaceous fuel or with very little carbonaceous fuel, and without previous calcining and water-concentration, I reduce the ore to a matte containing preferably about 40 per cent. of copper. For this purpose I use a furnace or converter having smelting twyers and bessemerizing twyers, and capable of withstanding the ordinary temperatures of the converting process. Into such furnace I introduce a predetermined charge of sulfid ores, together with oxid and carbonates if desired, with suitable flux to combine with the bases to be separated, the charge of ore being so selected and proportioned with relation to its content of iron and sulfur, as to admit of the process being carried on and to convert the bases into silicates without the use of carbonaceous fuel, or only a small amount of such fuel, beyond the amount necessary to ignite and thoroughly start the process. In this furnace the ore is smelted by the smelting twyers and the matte which sinks to the bottom after smelting is enriched by the converting twyers to a point where the resulting slag will not contain a greater proportion of copper and valuable metals than can be thrown away without undue loss. For this purpose it is desirable to enrich the matte so that in ordinary cases it will contain about 40 per cent. of copper, but the proportion may vary at different localities and will be regulated by the surrounding conditions, such as the cost of transportation and the cost of fluxes, etc.

Second. The second step or element of my process relates to the utilization of the slag from the smelting and converting furnace above described. This slag as it flows from the settling well of the furnace at a high temperature is not thrown away uselessly as has been the common practice heretofore, but is utilized for the development of heat in steam boilers or for like purposes. After having been used for this purpose the slag is discharged at the dump-pile. It may constitute over ninety per cent. of the original weight of the ore, and the proportion of values which the operator can afford to lose in it determines the degree of concentration to which the matte is carried in the first operation.

Third. The matte produced by the first operation above mentioned is transferred in a molten state from the tap-hole of the furnace and from the settling well preferably by gravity through inclined troughs to another furnace or converter provided with converting twyers, and capable of withstanding the ordinary converting temperature; and by means of the converting blast it is enriched until practically all of the bases to be separated are removed. Fluxes may be added in this operation if necessary, and means for supplying extraneous heat to the bath, as in the step No. 5, may be provided if desired.

Fourth. The slag from the operation last mentioned, contains necessarily a considerable percentage of copper. This slag having been withdrawn and solidified, is returned preferably by a conveyer and elevator to the ore-bins, from which it is taken as required and resmelted for the extraction of the values which it contains. The furnace last mentioned may be provided with a swinging trough by which the matter may be delivered into the spout of the third furnace, or by swinging the trough into other positions the slag may be delivered to a tilting pot or directly to the molds of the conveyer by which it is to be carried to the bins.

Fifth. The matte from the second refining operation above mentioned being freed from the bases, contains about 80 per cent. of copper. While still molten it is transferred, preferably by gravity, as above described, to another furnace or converter provided with converting twyers, and adapted to withstand the temperature of conversion, and provided also with a pipe or flue for the introduction of flame. The flame is preferably capable of regulation, and is adapted to develop and maintain heat sufficient to prevent the bath from chilling at the latter portion of the blow and preferably sufficient also to prevent the formation of "copper noses" or congealed masses of metal at the twyers, and to render needless the present practice of punching or freeing the twyer-ends therefrom. By the action of the blast in this vessel the matte is enriched to the point at which practically all of the sulfur, bismuth, antimony, selenium, tellurium and other objectionable impurities are eliminated; as can be determined by testing with a spectroscope or by the appearance of the flame to the eye of the experienced operator. I have found that to eliminate the last vestige of these objectional impurities it is necessary to blow the charge to the point where a small amount of oxid or sub-oxid of copper will be formed in the metal. At or near the end of the blow the floating impurities are removed from the surface of the bath by skimming or otherwise. The collection and removal of the floating impurities is made possible by the heating action of the flame, whereby the temperature of the bath is regulated and maintained at will.

Sixth. The copper produced by the last described operation has been kept by the flame hot enough to be readily poured by tilting the converter. Chilling of the copper, particularly at the tap-holes, which has been so objectionable and dangerous heretofore, does not occur. The copper from that converter is removed, preferably by gravity to another furnace, the flame in which is capable of regulation, and it is there poled to remove the suboxid, or if desired hydrocarbon gases may be injected below the surface of the copper, and suitable additions may be made to the metal for the more complete elimination of the impurities. The furnaces and converters above named are arranged at successively lower levels, so that the matte or metal produced in one will flow by gravity into the next, and the operation is thus rendered continuous. By this succession of steps refined copper of a high degree of purity may be obtained, or if desired, by omitting the last named step of the operation, what is known in the art as "pig copper" or "black copper" may be produced.

My invention may be modified. For example, the operations above numbered 3 and 5 may be consolidated, both being performed at one operation in a single furnace or converter. I prefer, however, to conduct them separately, since by doing so better commercial results are in my judgment obtained.

I claim:

1. The method herein described of producing copper, which consists in subjecting to a combined smelting and converting operation copper ores or compounds containing combustible impurities sufficient in amount to generate the required heat without any substantial addition of fuel, removing the slag and applying it in molten condition to heating purposes, transferring the matte in molten condition to another chamber, subjecting it therein to an air-blast, and eliminating the bases from the metal; then transferring it still molten to a heated furnace and refining it therein, by subjecting it to agitation with refining gases; substantially as described.

2. The herein described method of producing copper which consists in subjecting to a combined smelting and converting operation, copper ores or compounds containing combustible impurities sufficient in amount to generate the required heat necessary in maintaining a smelting operation without the addition of carbonaceous fuel; transferring the matte thus produced in molten form to another converting vessel, subjecting it therein to an air-blast and eliminating the iron contained in the matte by feeding into it silicious ores; thereafter eliminating any remaining sulfur, arsenic, bismuth, selenium, tellurium or such like impurities by means of a simple oxidizing blast; substantially as herein described.

3. The herein described method of producing copper which consists in subjecting to a combined smelting and converting operation, copper ores or compounds containing combustible impurities sufficient in amount to generate the required heat necessary in maintaining a smelting operation without the addition of carbonaceous fuel; transferring the matte thus produced in molten form to another converting vessel, subjecting it therein to an air-blast and eliminating the iron contained in the matte by feeding into it silicious ores; returning in molten form the converter slags thus produced, and which contain valuable mineral, to the vessel in which the first fusion for the elimination of the metalloids has been produced; thereafter eliminating any remaining sulfur, arsenic bismuth selenium, tellurium or such like impurities by means of a simple oxidizing blast; substantially as described.

4. The herein described method of producing copper which consists in subjecting to a combined smelting and converting operation; copper ores or compounds containing combustible impurities sufficient in amount to generate the required heat necessary in maintaining a smelting operation without the addition of carbonaceous fuel; transferring the matte thus produced in molten form to another converting vessel; subjecting it therein to an air-blast and eliminating the iron contained in the matte by feeding into it silicious ores; returning in molten form the converter slags thus produced, and which contain valuable mineral, to the vessel in which the first fusion for the elimination of the metalloids has been produced; thereafter eliminating any remaining sulfur, arsenic, bismuth, selenium, tellurium or such like impurities by means of a simple oxidizing blast; transferring the blister copper thus produced in molten form into a preheated refining furnace, which is provided with the auxiliary heat of an oil or a gas flame above the level of the molten bath and refining it therein for the elimination of suboxid; substantially as herein described.

In testimony whereof, I have hereunto set my hand.

RALPH BAGGALEY.

Witnesses:
WILLIAM M. KIRKPATRICK.
LYNN WILMOT SMITH.